(12) United States Patent  (10) Patent No.: US 8,831,527 B2
Kruse et al.  (45) Date of Patent: Sep. 9, 2014

(54) METHOD AND DEVICE FOR MEASURING THE ANTENNA DIVERSITY GAIN IN DIGITAL RADIO TRANSMISSION SYSTEMS

(75) Inventors: Gerhard Kruse, Windhagen (DE); Christine Crisan, Bonn (DE)

(73) Assignee: Deutsche Telekom AG, Bonn (DE)

( * ) Notice: Subject to any disclaimer, the term of this patent is extended or adjusted under 35 U.S.C. 154(b) by 1207 days.

(21) Appl. No.: 12/674,864

(22) PCT Filed: Aug. 19, 2008

(86) PCT No.: PCT/EP2008/006801
§ 371 (c)(1),
(2), (4) Date: Jan. 18, 2011

(87) PCT Pub. No.: WO2009/024320
PCT Pub. Date: Feb. 26, 2009

(65) Prior Publication Data
US 2011/0105042 A1  May 5, 2011

(30) Foreign Application Priority Data

Aug. 23, 2007  (DE) .......................... 10 2007 039 786

(51) Int. Cl.
H04B 17/00  (2006.01)
(52) U.S. Cl.
CPC .......... H04B 17/004 (2013.01); H04B 17/0087 (2013.01)
USPC ....................................................... 455/67.11
(58) Field of Classification Search
USPC ............ 455/63.4, 67.11, 67.12, 67.14, 226.1, 455/226.2, 232.1, 234.1, 234.2, 2, 45.1
See application file for complete search history.

(56) References Cited

U.S. PATENT DOCUMENTS 5,273,046 A * 12/1993 Butterfield et al. ........... 600/485
5,812,539 A    9/1998 Dent
(Continued)

FOREIGN PATENT DOCUMENTS

| DE | 19727516 A1 | 2/1999 |
| DE | 102005002801 A1 | 8/2006 |
| EP | 1523143 | 4/2005 |
| EP | 1523143 A1 | 4/2005 |

OTHER PUBLICATIONS

Dieter Emmer et al., Measurement of Base Station Two-Branch Space and Polarization Diversity Reception and a Comparison of the Diversity Gain Based on the CDF of Signal Level and Simulations of Ber in a GSM System, 48th IEEE Vehicular Technology Conference, 18-21, 1998, vol. 1, S. 5-10.

(Continued)

*Primary Examiner* — Yuwen Pan
*Assistant Examiner* — Mark Woodall
(74) *Attorney, Agent, or Firm* — Browdy and Neimark, PLLC

(57) ABSTRACT

The invention relates to a method and a device for measuring the antenna diversity gain in digital radio transmission systems, wherein the sensitivity of a receiver system is designed by using a plurality of antennas, wherein the signals thereof determine a diversity gain (DG) by means of the bit error rate (BER)-increase of the signals. The invention is characterized in that the method and the device for measuring the diversity-gain (DG) in digital radio transmission systems form an optimization of radio net planning by means of targeted use of diversity, wherein a decrease of the number of used base stations and an increase of the transmission- and receiving quality is achieved.

10 Claims, 8 Drawing Sheets

(56) References Cited

U.S. PATENT DOCUMENTS

| | | | |
|---|---|---|---|
| 6,532,087 B1 * | 3/2003 | Ransford et al. | 398/27 |
| 6,742,154 B1 * | 5/2004 | Barnard | 714/752 |
| 7,024,163 B1 * | 4/2006 | Barratt et al. | 455/69 |
| 2002/0160737 A1 * | 10/2002 | Crawford | 455/272 |
| 2003/0031282 A1 * | 2/2003 | McCormack et al. | 375/355 |
| 2003/0078486 A1 * | 4/2003 | Klein et al. | 600/398 |
| 2003/0099156 A1 * | 5/2003 | Sifferman et al. | 367/89 |
| 2004/0091057 A1 * | 5/2004 | Yoshida | 375/260 |
| 2004/0104844 A1 | 6/2004 | Rooyen et al. | |
| 2004/0125112 A1 * | 7/2004 | James | 345/589 |
| 2005/0185724 A1 * | 8/2005 | Wang et al. | 375/260 |
| 2005/0212970 A1 * | 9/2005 | Joskin | 348/572 |
| 2005/0218871 A1 * | 10/2005 | Kang et al. | 323/265 |
| 2006/0017630 A1 * | 1/2006 | Kildal | 343/703 |
| 2006/0176937 A1 | 8/2006 | Bottero et al. | |

OTHER PUBLICATIONS

Feher et al., Kamilo, "Modems for Emerging Digital Cellular Mobile Radio System", Vehicular Technology. IEEE Transactions, vol. 40, Issue 2, pp. 355-365, May 1991.

Dietrich et al., Carl B., "Spatial, Polarization, and Pattern Diversity for Wireless handheld Terminals", IEEE Transactions on Antennas and Propagation, vol. 49, No. 9, pp. 1271-1275, Sep. 2001.

* cited by examiner

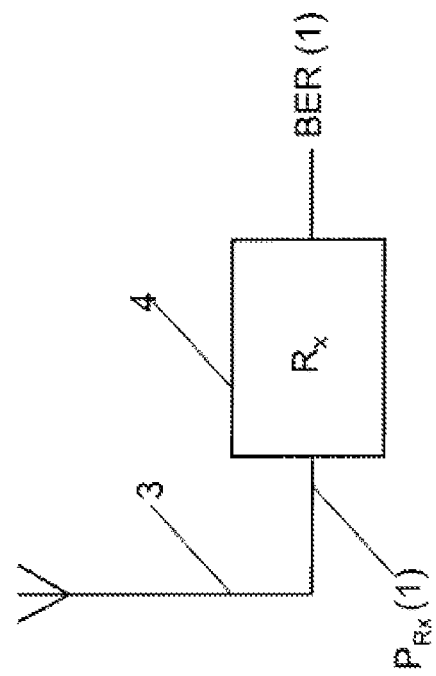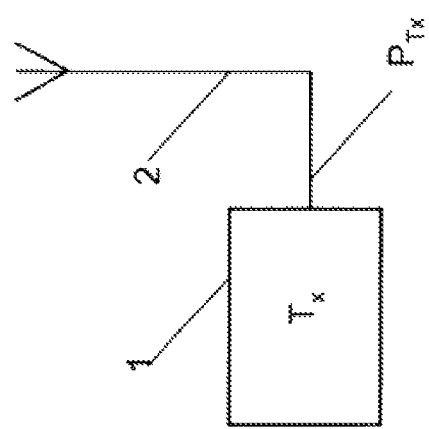
Fig. 2

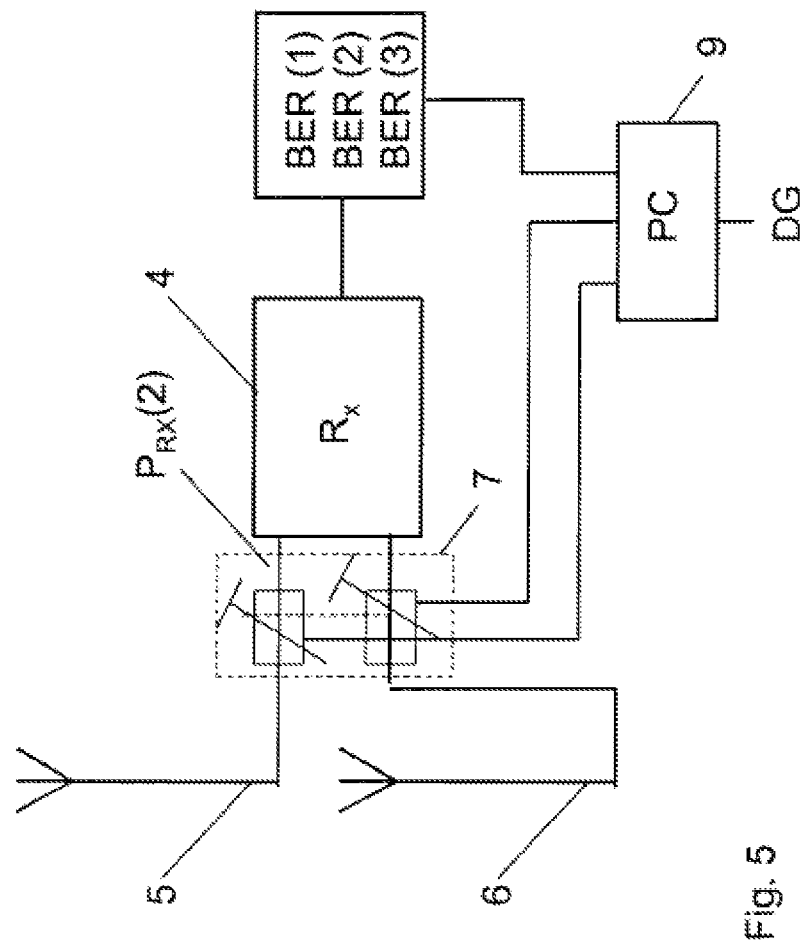
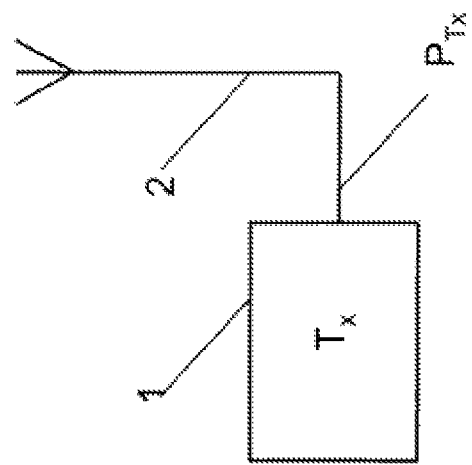
Fig. 5

METHOD AND DEVICE FOR MEASURING THE ANTENNA DIVERSITY GAIN IN DIGITAL RADIO TRANSMISSION SYSTEMS

FIELD

The invention relates to a method and a device for measuring the antenna diversity gain in digital radio transmission systems by measuring the improvement of the receiver system sensitivity by means of the bit error rate.

BACKGROUND

In general, diversity gain is defined as the increase of the receiver sensitivity in a given propagation scenario over the reception without diversity.

It is already known, in the context of radio systems in analog and digital technology, that an improvement of the sensitivity of a receiver system can be effected by using a plurality of antennas (in general two).

In conventional radio transmission applications, antenna diversity schemes are preferably employed in order to reduce fading effects (fluctuations of the receiver field strength during radio transmissions).

An exactly defined and precisely quantifiable determination of the diversity gain (DG) that would allow additional system parameters, such as for example the required transmission power of a station, to be derived therefrom and optimized for design purposes, however, has thus far not been satisfactorily established.

According to the prior art the diversity gain (DG) is expressed statically (for a fixedly defined connection distance) with a defined antenna configuration. This information is inadequate for many applications, such as for example in mobile radio communications.

A precise definition of the diversity gain (DG) is therefore needed. One proposal for determining or measuring the diversity gain (DG) in the case of portable terminals is disclosed in the publication by Tsunekawa (Spatial, Polarisation, and Pattern Diversity for Wireless Handheld Terminals).

In this case the diversity gain (DG) is determined by means of the S/N improvement and the correlation factor of the signals delivered by two antennas. The measurement of both values is very problematic, lengthy, and imprecise [comparison of measurement with theory, see Tsukenawa FIG. 8-4 (d)].

DE 197 27 516 A1 discloses a method for the determination of the internal static noise of digital circuits, wherein the relationship log (BER)=f(Pe) with C/I as a parameter is used, which relationship is also used in the context of the method described below, where parallel straight lines are also calculated by means of interpolation of neighboring straight lines.

U.S. Pat. No. 5,812,539 A and US 2004/104844 A1 disclose (diversity-) receiver systems and the application of interpolated/extrapolated values, wherein the input power at the receiver system is reduced in order to thereby produce a diversity gain.

The problem addressed by the present invention is therefore considered that of providing a method that supplies, for a certain radio transmission system (e.g. UMTS, B3G, WLAN), a defined diversity gain (DG) value quickly and with high accuracy for development and design purposes.

SUMMARY

The solution to this problem is provided by a method including the steps of measurement of the input power of the receiver system and the corresponding bit error rate BER for the respective propagation scenario; measurement of the (BER) at equal system input power with a plurality of antennas; reduction of the system input power where the BER is about equal to the BER according to step 1 of the method; and determination of the diversity gain (DG) from the improvement of the BER by means of interpolation/extrapolation.

The most important feature is that the method and the device for measuring the diversity gain (DG) in digital radio transmission systems implements an optimization of radio network designs by means of a targeted use of diversity, whereby a decrease of the number of base stations used and an increase of the transmission and reception quality is achieved.

A method and a device are thus disclosed by means of which the diversity gain (DG) of antenna arrays in digital, stationary, and mobile radio transmission systems is measured accurately and quickly.

A significant advantage of the utilized method is that through the use of diversity and its exact quantification, radio network designs are optimized.

An additional advantage is that the transmission quality is improved and/or the number of base stations in mobile radio transmission systems is reduced.

Measuring a diversity gain (DG) value with high accuracy according to the inventive method is particularly important in order to optimize the transmission capacities in future radio transmission systems (beyond 3G), that are e.g. based on MIMO (Multiple Input Multiple Output) methods for which the transmission paths are preferably uncorrelated.

For the sequence of the measurements as provided, a device is described.

The measurements according to the invention can be performed at installed base stations during operation, or in the laboratory, for example with the replication of different propagation paths by means of a radio channel simulator.

From the measurement of the bit error rate (BER) and the receiver input power ($P_{RX}$) of a digital communication transmission system the diversity gain (DG) is determined in a given wave propagation scenario.

Since the bit error rate (BER) and the receiver input power ($P_{RX}$) can be measured very precisely, the diversity gain (DG) can also be determined with high accuracy according to the inventive method.

BRIEF DESCRIPTION OF THE DRAWINGS

Below, the invention will be explained in more detail based on illustrating drawings. Additional features that are essential for the invention and advantages of the invention will become apparent from the drawings and their description.

The drawings show:
FIG. 2: an illustration of measurement 1 (without diversity)
FIG. 5: a graphical representation of a diversity gain measurement, e.g. at a UMTS base station

DETAILED DESCRIPTION

Figure 1:
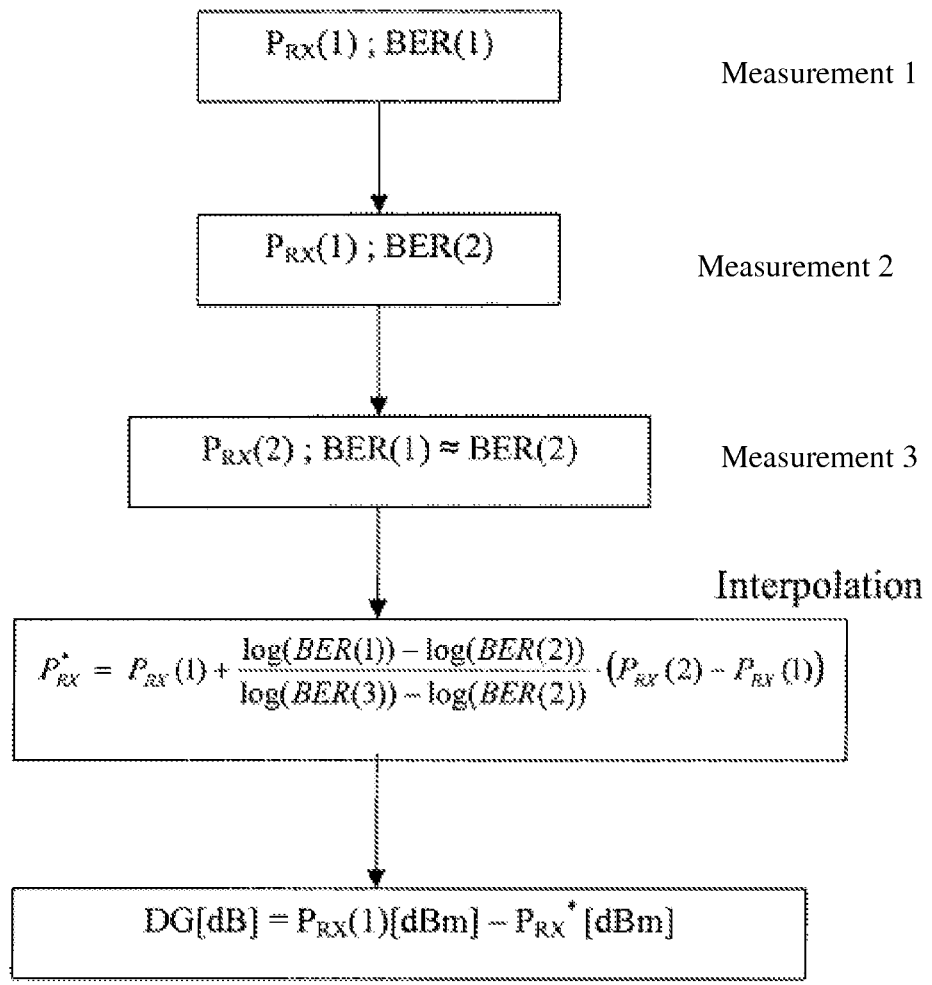
FIG. 1: a flow diagram of the method
Figure 3:
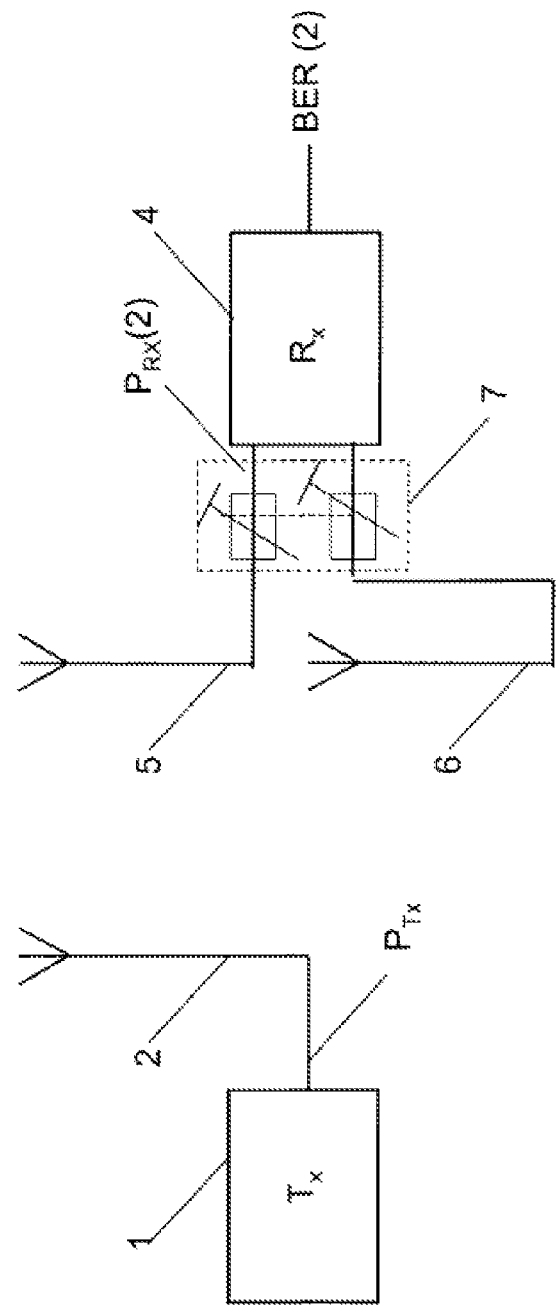
FIG. 3: an illustration of measurement 2 (with diversity)

The method shown in FIGS. 1 to 8 for measuring a diversity gain (DG) of a radio transmission system is illustrative for additional implementation variants for a measuring set-up with one transmission and two receiving antennas.

Analogous conditions result with two transmission and one receiving antenna (2, 4) (transmission diversity).

The measuring method is also suitable for more than two transmission and/or receiving antennas, such as for example for MIMO systems.

The diversity gain is dependent on the following factors:
type and configuration of the antennas
frequency
propagation scenario
diversity algorithm of the receiver.

Since in radio transmission different propagation scenarios and therefore different diversity gains can arise, threshold values (minimum and maximum diversity gains) or averages of the diversity gain are proposed.

A radio transmission system can be designed with a "best case", "worst case", or a weighted average of the diversity gain.

The method for measuring the diversity gain (DG) is performed under the following conditions during a measurement:
- a constant power $P_{TX}$ of a transmitter (1) drives an antenna (3) (FIG. 2 and FIG. 3)
- quasi stationary propagation conditions (invariant propagation paths and equal fading)
- constant velocity of a station in mobile radio systems.

FIGS. 1 to 8 show the measurement method, which is described in more detail in the steps below.

1. Measurement of the envelope power of the input power $P_{RX}(1)$ of the receiver 4 with one receiving antenna 3 and the corresponding bit error rate (BER[1]).

2. Adjustment of the input power $P_{RX}(1)$ at the diversity inputs of the receiver 4 with the receiving antennas 5 and 6.

An attenuation adjuster 7 is set to 0 dB in both branches.

Since by means of the reception of the preferably uncorrelated signals of both antennas 5, 6 an improvement of the transmission is to be accomplished, a bit error rate BER(1) >BER(2) is expected.

3. Reduction of the input power with the attenuation adjuster 7 equally in both diversity branches, by the approximately expected diversity gain to the input power $P_{RX}(3)$, such that the bit error rate becomes BER[3]~BER[1] (see FIG. 4).

This corresponds to a reduction of the transmission power $P_{TX}$ by the amount of the attenuation adjusted with the attenuation adjuster 7.

Figure 4:
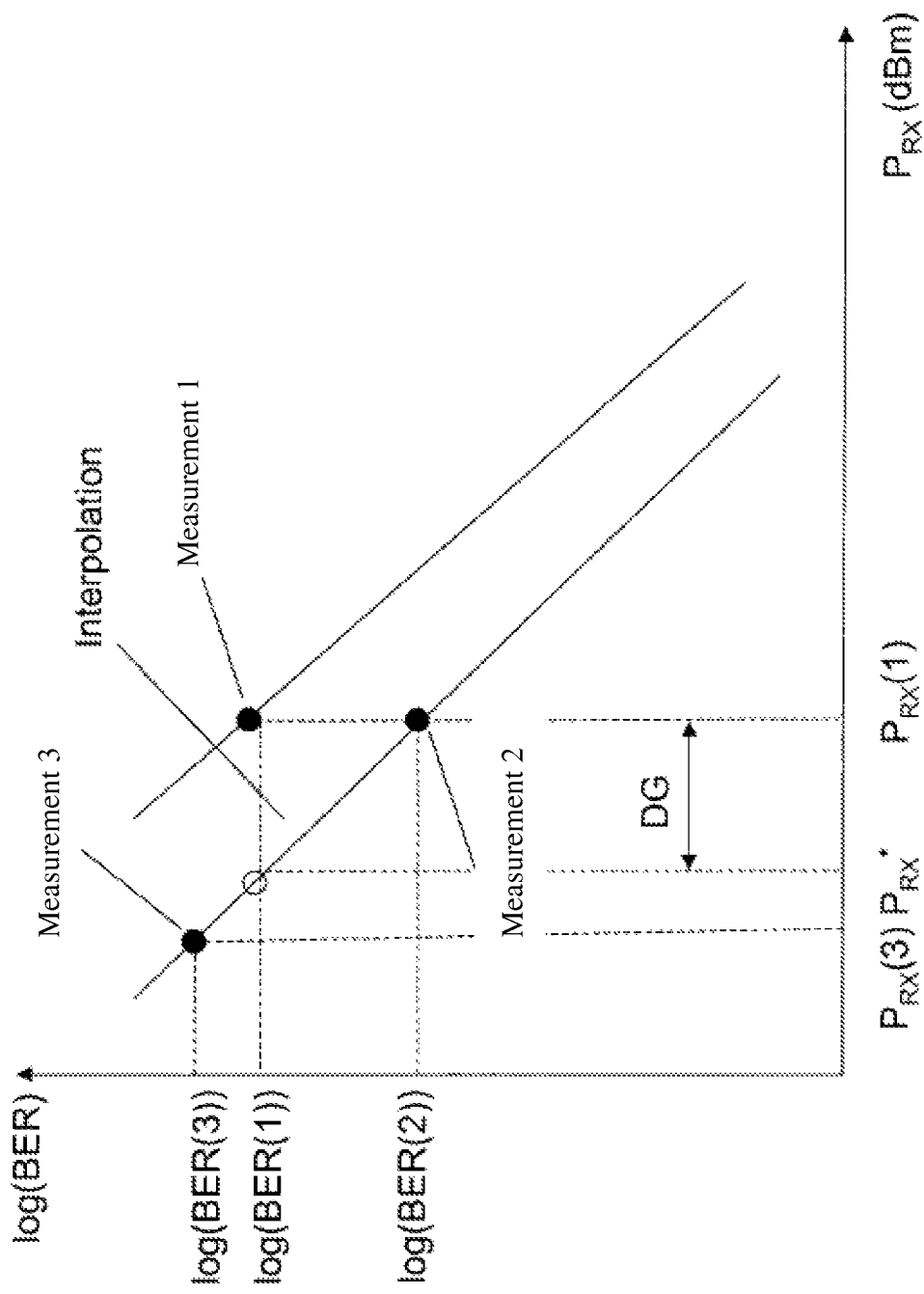
FIG. 4: a graphical representation of the linear interpolation or extrapolation of the measured values

4. Linear interpolation or extrapolation of the measured values of the input powers $P_{RX}(2)$ and $P_{RX}(3)$, in order to calculate the input power $P_{RX}*$ for the bit error rate BER(1) (FIG. 4).

From the publication by Kamilo Feher "MODEMS for Emerging Digital Cellular-Mobile Radio System", IEEE Transactions on Vehicular Technology, May 1991 or from DE 197 27 516 B4 it is known that the logarithm of the bit error rate is reciprocal linearly proportional to the input power in the range that is of interest here.

Results:
Bit error rate BER(1) at input power $P_{RX}(1)$ without diversity and input power $P_{RX}*$ with diversity.

5. Determination of the diversity gain (DG):

$$DG/db = P_{RX}(1)/dBm - P_{RX}*/dBm$$

The measurements according to point 2 to 5 are independent of the algorithm with which the diversity signals are processed in receiver 4. As a result, this measuring method can also be used to compare the effectiveness of different diversity methods and MIMO systems.

Preferably, the propagation conditions are defined with the aim of a better reproducibility of the measurements with a radio channel simulator 8.

An embodiment of the invention that is expedient for mobile radio systems is a diversity gain (DG) determination of the base station antenna systems for connections that deliver a high or a low diversity gain (DG) value corresponding to the propagation conditions of the radio cell (diversity gain threshold values of an antenna system within a radio cell).

The measuring sequences according to FIG. 1 are preferably performed automatically.

A computer 9 controls and acquires the measurements 1 to 3 according to FIG. 1, then performs the interpolation and calculates the diversity gain (DG).

Figure 6:
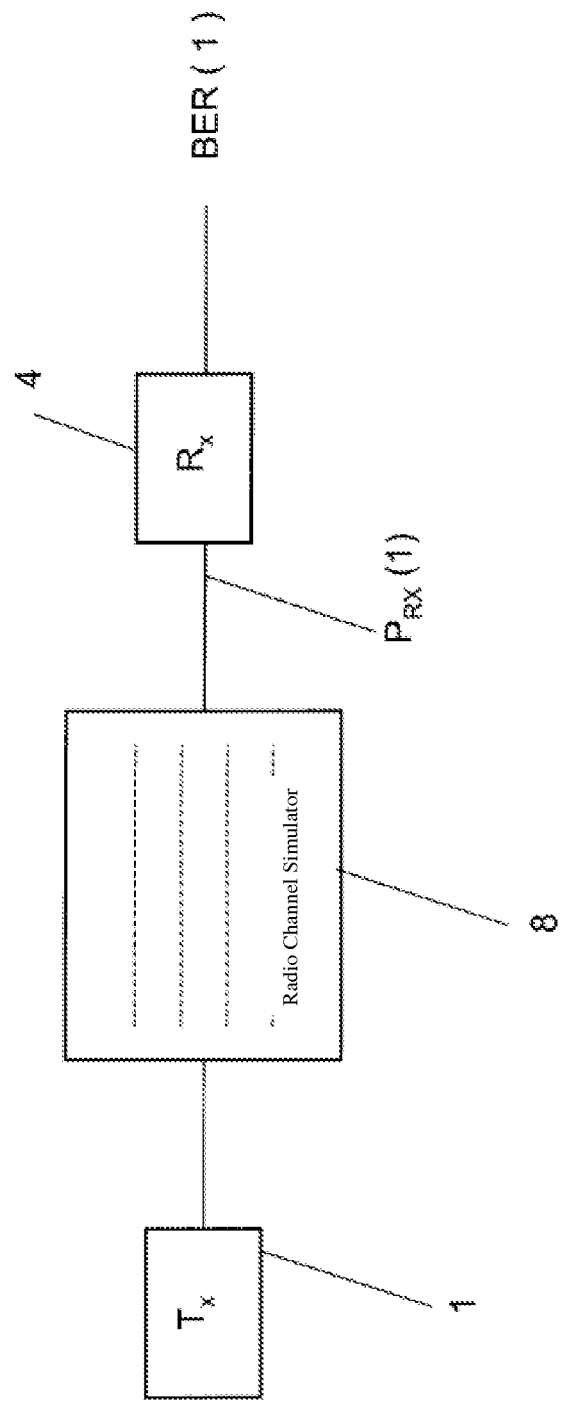
FIG. 6: a graphical representation of a transmission path with a radio channel simulator without diversity (n transmission paths)
Figure 7:
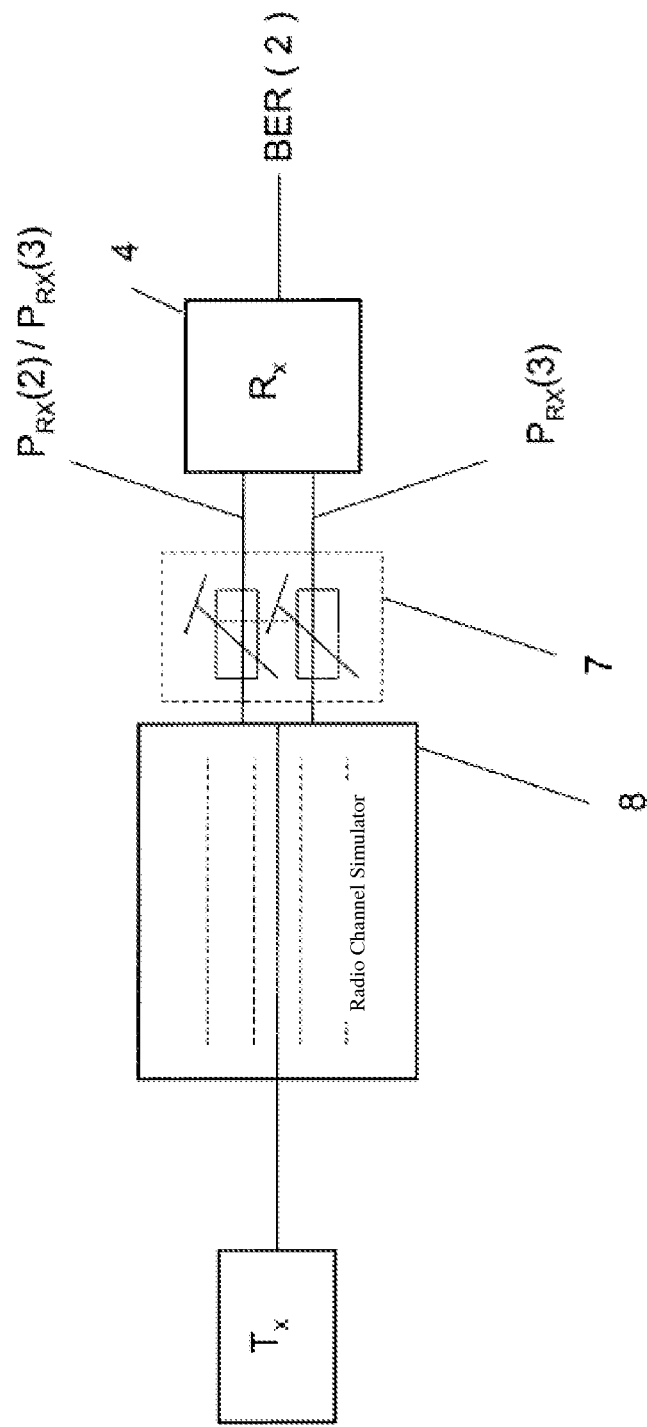
FIG. 7: a graphical representation according to FIG. 6 with diversity (2n transmission paths)
Figure 8:
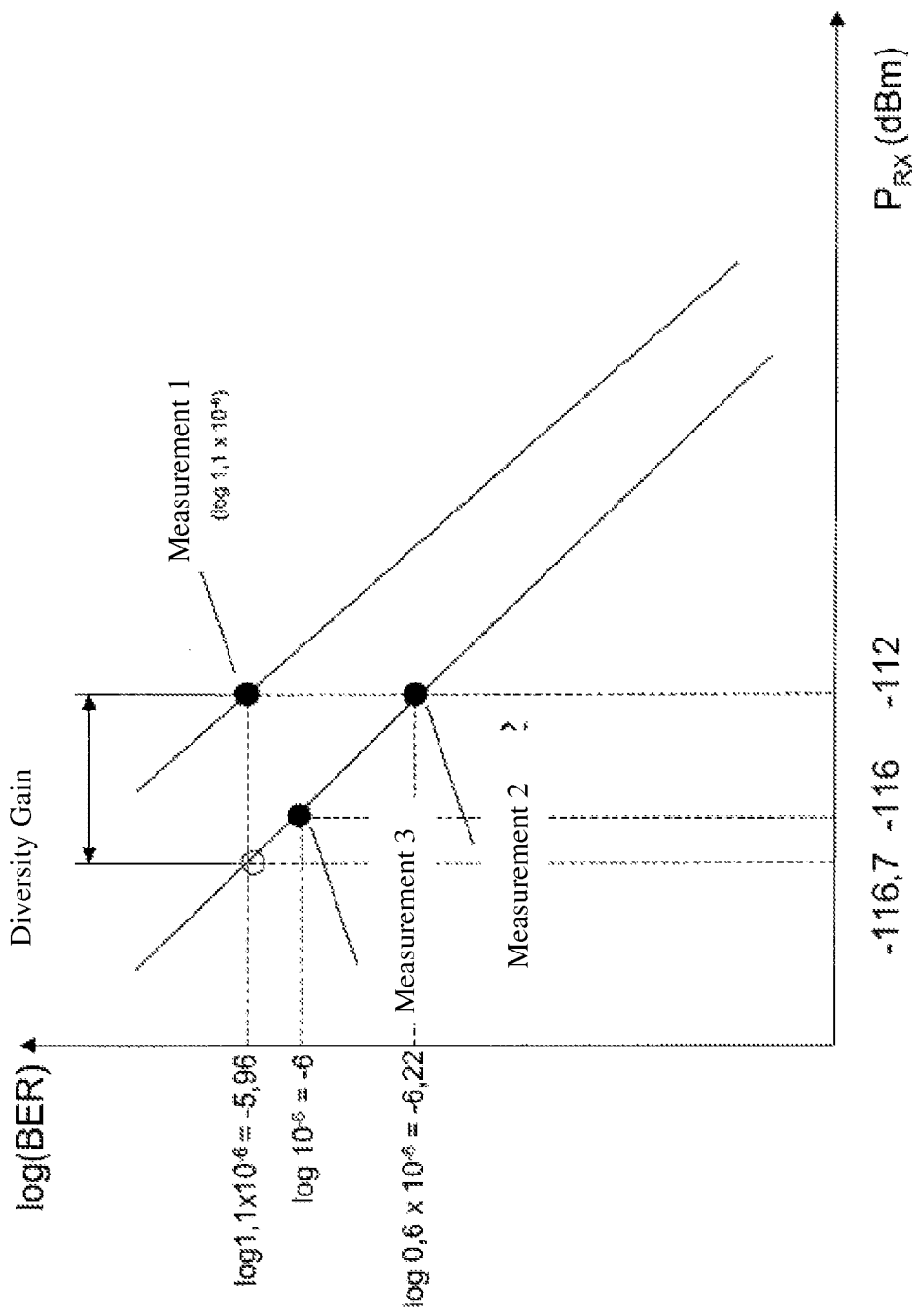
FIG. 8: a graphical representation of the linear interpolation or extrapolation of the measured values (illustrative embodiment)

The diversity gain measurement at a UMTS base station with two diversity antenna inputs is explained below as an example. The transmission path is formed with one radio channel simulator 8 with n transmission paths without diversity and 2n transmission paths with diversity (FIGS. 6 and 7).

Measurement 1 (FIG. 6):

Simulation of n (e.g. n=4 according to 3G TS 25.104) transmission paths between the output of the transmitter 1 and the output of the radio channel simulator 8.

Measurement of the input power $P_{RX}(1)$ and the bit error rate BER(1) (e.g. $P_{RX}(1)$=31 112 dBm und BER(1)=1.1×10$^{-6}$).

Measurement 2 (FIG. 7):

Same settings of the radio channel simulator 8 as with measurement 1.

Additional reception by means of the second diversity channel with the same settings as channel 1.

Measurement of the input power $P_{RX}(2)$ and the bit error rate BER(2) (e.g. $P_{RX}(2)$=−112 dBm und BER(2)=0.6×10$^{-6}$).

Measurement 3 (FIG. 7):

Reduction of the receiver input power $P_{RX}$ with the attenuation adjuster 7 by 4 dB (expected diversity gain): $P_{Rx}(3)$=−116 dBm und BER(3)=10$^{-6}$).

Extrapolation (FIG. 8):

Using the illustrative measurement results, the extrapolation of both measurements 2 and 3 results in the bit error rate BER(1)=1.1×10$^{-6}$ (measurement 1) at $P_{RX}*$=−116.7 dBm.

Determination of the Diversity Gain (DG):

This results in:

Diversity gain=−112 dBm−(−116.7 dBm)=4.7 dB.

The duration of a measurement process (measurements 1 to 3) across, for example, 2×10$^6$ bits amounts to about 5 seconds for UMTS with 384 kBit/s transmission rate.

In the case of propagation conditions with a very long fading the measuring time can be extended.

With an automatic adjustment and evaluation of the three measurement values, a diversity gain measurement can be performed in <1 min.

As a result, variations for optimization measures in the design concept and/or the antenna installation can be implemented very quickly.

Through the targeted use of diversity the radio network design can be optimized, the quality can be improved and/or the number of base stations can be reduced.

The method and the device according to claims 1 to 8 provide an informative and accurate method for optimizing base stations that can be performed quickly.

The subject matter of the present invention is formed not only by the subjects of the individual patent claims but also by the combination of the individual patent claims among each other.

All information and features disclosed herein, including in the abstract, in particular the three-dimensional embodiment shown in the drawings are claimed as essential to the invention to the extent that they are novel over the prior art, individually or in combination among each other.

LIST OF REFERENCE SYMBOLS

1. Transmitter
2. Transmission antenna
3. Receiving antenna
4. Receiver
5. Receiving antenna 1 (Diversity)
6. Receiving antenna 2 (Diversity)
7. Attenuation adjuster
8. Radio channel simulator
9. Computer

What is claimed is:

1. A method for measuring antenna diversity gain of digital systems by measuring improvement of a receiver system sensitivity by measuring bit error rate (BER), wherein the method comprises the following steps:
  measuring a first input power $P_{RX}(1)$ of a receiver system (4) and a corresponding first bit error rate BER (1) for a respective propagation scenario with one antenna (3);
  measuring a second bit error rate BER(2) at the receiver system (4) at a second system input power $P_{RX}(2)$ equal to the first input power $P_{RX}(1)$ with a plurality of antennas (5, 6);
  reducing the first input power at the receiver system (4) to a third input power $P_{RX}(3)$, at which a corresponding third bit error rate BER(3) is about equal to the first bit error rate BER(1) according to the step of measuring the first input power;
  determining an expected input power $P_{RX}^*$ to be expected at the third bit error rate BER(3) from the determined first and second input powers $P_{RX}(1)$, $P_{RX}(2)$ and the first, second and third bit error rates BER(1), BER(2) and BER(3) by interpolation/extrapolation; and
  determining the antenna diversity gain (DG) by calculating a difference between the first input power $P_{RX}(1)$ and the expected input power $P_{RX}^*$.

2. The method according to claim 1, wherein the method is designed for measurements in reciprocal operation.

3. The method according to claim 1, wherein the measurements required for the determination of the diversity gain (DG) value can be performed by base stations that are in operation, or in a laboratory, the DG values measured in the laboratory being measured with replication of different propagation paths by means of a radio channel simulator (8).

4. The method according to claim 1, wherein the measuring method is performed on a measurement set-up with at least one transmission antenna and at least two receiving antennas.

5. The method according to claim 1, wherein the diversity gain (DG) is determined by the following factors:
  type and configuration of the antennas;
  frequency;
  propagation scenario; and
  diversity algorithm of the receiver.

6. The method according to claim 1, wherein the radio transmission system can be designed by means of an upper or lower threshold value or by means of an average of the diversity gains (DG).

7. The method according to claim 1, wherein
  a constant power of a transmitter (1) drives a transmitting antenna (2);
  quasi stationary propagation conditions are present; and
  a constant velocity of a station in mobile radio systems is present.

8. The method according to claim 1, wherein the measurement further comprises the following method steps:
  attenuating the first input power by an attenuation adjuster (7).

9. The method according to claim 1, wherein for reducing the input power at the receiver system (4) an attenuation adjuster (7) is used.

10. The method according to claim 1, wherein the method is performed on a computer (9) that automatically executes, acquires and interpolates the measurements and performs the calculation of the diversity gain (DG).

\* \* \* \* \*